Patented Feb. 23, 1926.

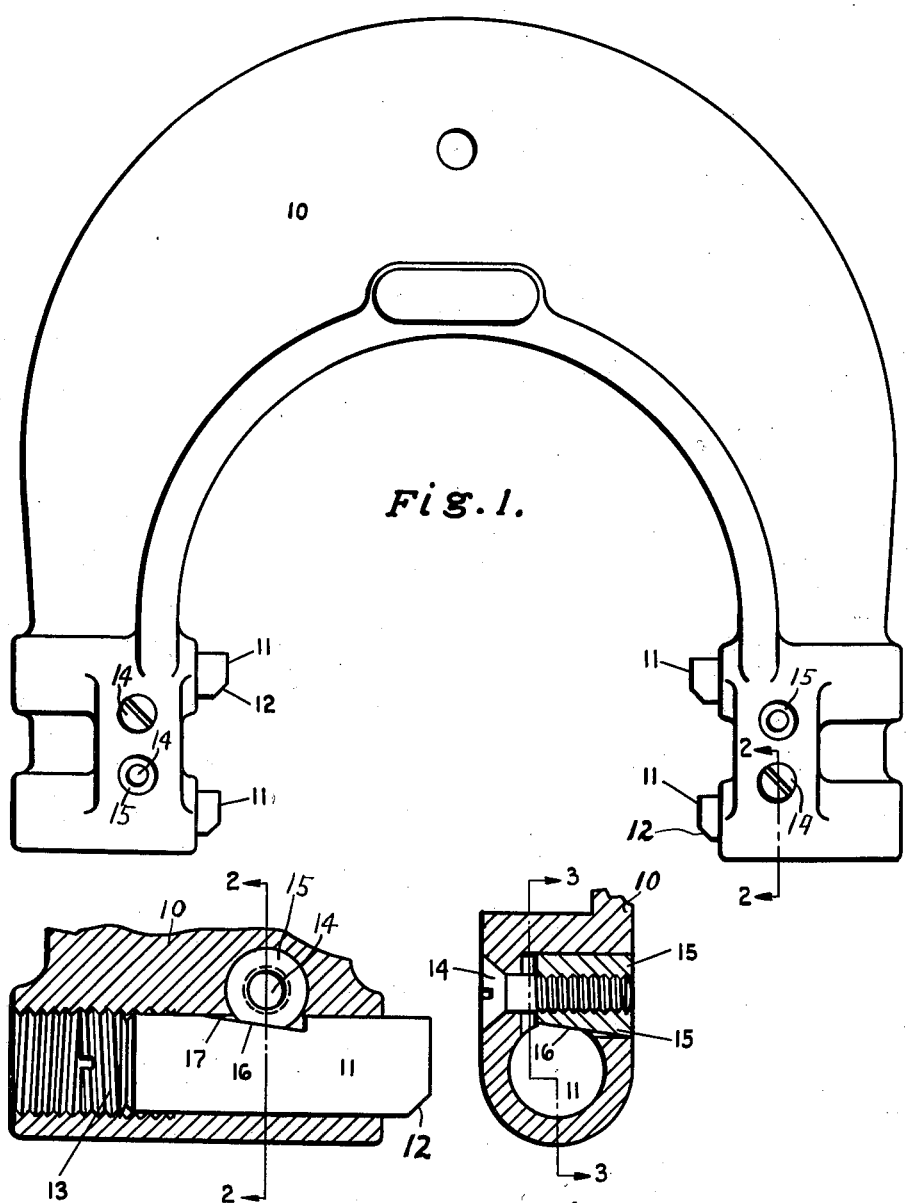

1,574,735

UNITED STATES PATENT OFFICE.

JOSEPH B. PALOSKI, OF DETROIT, MICHIGAN, ASSIGNOR TO FORD MOTOR COMPANY, OF DETROIT, MICHIGAN, A CORPORATION OF DELAWARE.

GAUGE.

Application filed May 31, 1924. Serial No. 717,032.

*To all whom it may concern:*

Be it known that I, JOSEPH B. PALOSKI, a citizen of the United States, residing at Detroit, in the county of Wayne and State of Michigan, have invented new and useful Improvements in a Gauge, of which the following is a specification.

The object of my invention is to provide a new and useful gauge of simple, durable and inexpensive construction.

A further object of my invention is to provide a method for locking pins in a gauge so that they will not become displaced to render the gauge inaccurate. It will be understood in connection with snap gauges it has been customary to provide movable pins or plugs which could be adjusted toward and from each other so that work to be measured might be slipped between these adjustable pins to determine if it is of proper size. It is highly important that these pins should be set and locked in place so that they cannot be moved with ordinary handling as otherwise the work being measured might vary in size thereby causing a large amount of inconvenience and expense.

A further object of my invention is to lock these pins in a gauge so that they will be automatically forced against the adjusting screw, thereby insuring that the locking of the pin will be exactly at the right place.

With these and other objects in view, my invention consists in the arrangement, combination, and construction of the various parts of my improved device, as described in the specification, claimed in my claim, and shown in the accompanying drawings, in which:

Figure 1 shows a plan view of a gauge equipped with my invention,

Figure 2 shows a vertical sectional view taken on the line 2—2 of Figure 1, and

Figure 3 shows a sectional view taken on the line 3—3 of Figure 2.

Referring to the accompanying drawings, I have used the reference numeral 10 to indicate generally a U shaped frame member designed to form the support of my gauge structure and which receives a pair of adjustable pins 11 at either end thereof. These pins 11 have inclined front faces 12 so that a piece of material to be measured may be forced between the opposite pins 11 to determine whether it will pass between the pins or not. Usually the outer pair of pins are adjusted so that they are slightly further apart than the inner pair of pins and the pieces are measured by attempting to force them through between these pairs of pins. If the piece fails to go between the outer pair of pins it will be too large and if it goes between both pairs of pins the piece will be too small. If, however, it will pass between the first pair of pins but not between the second pair of pins, then it is within the permissible limits of the size of the piece desired.

These pins must be very carefully adjusted so they will be the proper distance apart and they must also be locked in place when so adjusted so that the ordinary handling of the gauge or its use will not displace the pins.

Various methods have heretofore been proposed for accomplishing this locking but I have not seen any of such methods which were thoroughly satisfactory.

The construction shown in the attached drawing and herein described has, however, proven very satisfactory after many tests and considerable use.

The pins 11 are slidably mounted in cylindrical openings in the gauge frame 10, the openings being threaded at their outer ends. A set screw 13 is mounted in these threads back of the pins 11 so that the pins may be forced inwardly to the position desired. When the plugs have reached this position then they are locked in place by rotating a screw 14 which draws a nut 15 having a tapered flat face 16 against an inclined face 17 in the side of the pin 11. It will be noted that the tapering of the flat side or face on the nut 15 will compensate for wear due to the engagement of the parts of the gauge and that the inclination of the flat 17 on the pin 11 will cause this plug to be forced outwardly against the set screw 13, thereby wedging the pin 11 between the nut 15 and the set screw 13 to thereby lock the pin 11 in its adjusted position.

Among the many advantages resulting from the use of my improved locking device, it should be specifically pointed out that the locking of the pins may be readily accomplished and yet they may be readily loosened for readjustment when desired. The locking is very positive so that it is impossible to move the pin 11 even by turning the set screw 13 without very great effort. In fact, I have found that the locking device herein shown and described is thoroughly satisfactory for all practical purposes, as I have found that gauges having my improved locking device will satisfactorily gauge approximately ten times as many pieces of work without being readjusted as will the gauges with the locking devices with which I have been familiar. For instance, in one test on a production job it was found that gauges equipped with my improved locking device would satisfactorily gauge 3300 pieces on an average where the same gauges with other types of locking devices had previously only averaged 300 pieces before they required resetting.

I claim as my invention:

In a locking device for gauges having a frame with pins adjustably mounted therein, each of said pins being formed with a face inclined to the longitudinal axis thereof, an elongated locking member adjustable in said frame transversely of said pin and having a face inclined to its longitudinal axis and designed to coact with the inclined face on the pin whereby longitudinal movement of the locking member will tend to force the pin against the adjusting device of the gauge to thereby lock said pin from accidental displacement in use.

JOSEPH B. PALOSKI.